United States Patent
Adams et al.

(10) Patent No.: US 10,761,857 B2
(45) Date of Patent: Sep. 1, 2020

(54) HARDWARE MANAGEMENT

(71) Applicant: HEWLETT PACKARD ENTERPRISE DEVELOPMENT LP, Houston, TX (US)

(72) Inventors: Aland Adams, Fort Collins, CO (US); Charles E. Fowler, Fort Collins, CO (US); Bruce A. Lundeby, Fort Collins, CO (US); Craig A. Boeker, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 199 days.

(21) Appl. No.: 15/754,186

(22) PCT Filed: Nov. 29, 2015

(86) PCT No.: PCT/US2015/062868
§ 371 (c)(1),
(2) Date: Feb. 21, 2018

(87) PCT Pub. No.: WO2017/091236
PCT Pub. Date: Jun. 1, 2017

(65) Prior Publication Data
US 2018/0246728 A1    Aug. 30, 2018

(51) Int. Cl.
*G06F 9/4401*    (2018.01)
*G06F 9/445*    (2018.01)
*G06F 8/61*    (2018.01)

(52) U.S. Cl.
CPC .............. *G06F 9/4401* (2013.01); *G06F 8/63* (2013.01); *G06F 9/44505* (2013.01)

(58) Field of Classification Search
CPC ....... G06F 9/4401; G06F 8/63; G06F 9/44505
See application file for complete search history.

(56) References Cited

U.S. PATENT DOCUMENTS

| 8,892,700 B2 | 11/2014 | Dehaan et al. |
| 8,943,203 B1 | 1/2015 | Lent et al. |
| 8,949,585 B2 | 2/2015 | Hiltgen et al. |

(Continued)

FOREIGN PATENT DOCUMENTS

| CN | 102193817 A | 9/2011 |
| EP | 2357558 A2 | 8/2011 |

OTHER PUBLICATIONS

International Search Report and the Written Opinion, International Application No. PCT/US2015/062868, dated Aug. 26, 2016, pp. 1-10, KIPO.

(Continued)

*Primary Examiner* — Aurel Prifti
(74) *Attorney, Agent, or Firm* — Hewlett Packard Enterprise Patent Department

(57) ABSTRACT

In one example, a non-transitory computer readable medium for hardware management includes instructions to generate an instruction volume by copying a master volume, wherein the instruction volume is a computing device image, execute a set of scripts to alter the instruction volume based on a profile for a computing device, and deploy the instruction volume to the computing device to configure the computing device based on the profile for the computing device.

17 Claims, 3 Drawing Sheets

(56) References Cited

U.S. PATENT DOCUMENTS

| | | | |
|---|---|---|---|
| 9,846,582 B2* | 12/2017 | Knichel | G06F 9/4401 |
| 2003/0041131 A1* | 2/2003 | Westerinen | G06F 16/20 |
| | | | 709/221 |
| 2003/0076349 A1* | 4/2003 | Slaby | H04L 41/0856 |
| | | | 715/735 |
| 2003/0204711 A1* | 10/2003 | Guess | G06F 9/44505 |
| | | | 713/1 |
| 2004/0015957 A1* | 1/2004 | Zara | G06F 9/4411 |
| | | | 717/174 |
| 2004/0117462 A1* | 6/2004 | Bodin | H04L 12/2805 |
| | | | 709/220 |
| 2004/0260565 A1 | 12/2004 | Zimniewicz et al. | |
| 2005/0050175 A1* | 3/2005 | Fong | G06F 9/44505 |
| | | | 709/220 |
| 2005/0060408 A1* | 3/2005 | McIntyre | G05B 23/0216 |
| | | | 709/225 |
| 2005/0223210 A1* | 10/2005 | Sasaki | G06F 8/63 |
| | | | 713/2 |
| 2006/0173912 A1 | 8/2006 | Lindvall et al. | |
| 2011/0173302 A1* | 7/2011 | Rider | G06F 9/44505 |
| | | | 709/220 |
| 2011/0197053 A1* | 8/2011 | Yan | G06F 8/63 |
| | | | 713/2 |
| 2011/0197055 A1* | 8/2011 | Spottswood | G06F 9/4401 |
| | | | 713/2 |
| 2011/0246981 A1* | 10/2011 | Braun | G06F 8/63 |
| | | | 717/175 |
| 2012/0081395 A1* | 4/2012 | Adi | G06F 8/63 |
| | | | 345/634 |
| 2012/0158920 A1* | 6/2012 | Yang | G06F 9/45558 |
| | | | 709/220 |
| 2012/0254861 A1 | 10/2012 | Down, Jr. et al. | |
| 2013/0227543 A1 | 8/2013 | Chen | |
| 2015/0057467 A1* | 2/2015 | Hanson | C07C 209/16 |
| | | | 564/475 |
| 2015/0058467 A1 | 2/2015 | Douglas et al. | |
| 2015/0067854 A1* | 3/2015 | Kim | H04L 63/1408 |
| | | | 726/23 |
| 2015/0089031 A1* | 3/2015 | Kalali | H04L 67/34 |
| | | | 709/220 |
| 2015/0271014 A1* | 9/2015 | Madama | H04L 41/0893 |
| | | | 709/222 |

OTHER PUBLICATIONS

Oracle, "Oracle OPS Center: Provisioning and Patch Automation Pack," Oracle Data Sheet, Mar. 15, 2010, pp. 1-5.

European Search Report and Search Opinion Received for EP Application No. 15909424.2, dated Oct. 18, 2018, 9 pages.

* cited by examiner

| CREATE SERVER PROFILE | | |
|---|---|---|
| GENERAL | | |
| NAME | SERVER 1 | ←466 |
| DESCRIPTION | | ←468 |
| SERVER PROFILE TEMPLATE | SPT 1 ×Q ▼ | ←470 |
| SERVER HARDWARE | UNASSIGNED ×Q ▼ | ←472 |
| SERVER HARDWARE TYPE | BL660C GEN8 1 CHANGE | ←474 |
| ENCLOSURE GROUP | MY EG CHANGE | ←476 |
| AFFINITY | DEVICE BAY ▼ | ←478 |
| OS DEPLOYMENT SETTINGS | | |
| OS DEPLOYMENT PLAN | OSV1 SEPT 2014 ×Q ▼ | ←480 |
| VALUE SETTINGS | SETTING  VALUE | |
| | HOSTNAME  e05b03.VCPP.XYZ.COM | ←482 |
| | SSH ENABLE  ⦿ENABLE ○DISABLE | |

Fig. 4

HARDWARE MANAGEMENT

BACKGROUND

Computing systems can utilize hardware, instructions, or logic to execute a set of workloads. In some examples, the computing system can include a set of computing devices to execute the set of workloads. The set of computing devices can utilize a set of server images that act as a duplicate copy of boot data within the set of computing devices. For example, a computing device can utilize a server image to boot the computing device. In some examples, the set of server images can be utilized to restore system data or configure system data to a computing device.

BRIEF DESCRIPTION OF THE DRAWINGS

FIG. 4 illustrates a diagram of an example user interface for hardware management consistent with the present disclosure.

DETAILED DESCRIPTION

Figure 1:
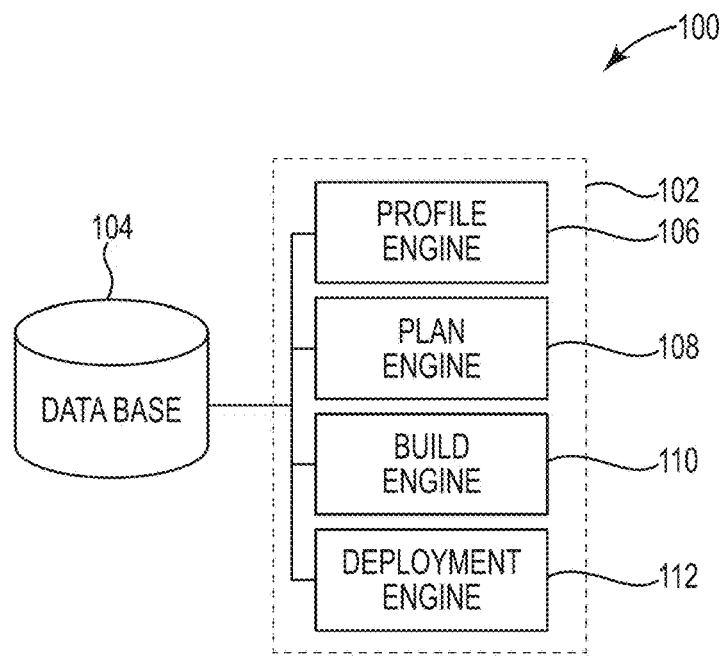
FIG. 1 illustrates a diagram of an example system for hardware management consistent with the present disclosure.

A set of examples for hardware management are described herein. In one example, a non-transitory computer readable medium for hardware management includes instructions to generate an instruction volume by copying a master volume, wherein the instruction volume is a computing device image, execute a set of scripts to alter the instruction volume based on a profile for a computing device, and deploy the instruction volume to the computing device to configure the computing device based on the profile for the computing device. In some examples, the instruction volume can include operating system instructions, other instructions (e.g., firmware, etc.), data or meta data corresponding to a computing device. In some examples, the golden image can include a version of a cloned hardware or instruction configuration for a computing device.

In some examples, the hardware management can provide a plurality of server management actions based on a profile. In some examples, the server management actions can include, but are not limited to: a deployment of an instruction volume, a modifying of computing device firmware, and computing device configuration to ensure that the computing device state is compatible with the instruction volume content. In some examples, the computing device can be a server such as a server blade within a blade enclosure.

In some examples, a computing device may have a plurality of profiles and corresponding instruction volumes. In some examples, the instruction volumes can be stored within volume storage. In some examples, the volume storage can be physically separate from the computing devices. In these examples, the instruction volumes can be physically separate for updates of the computing device, computing device repair, or instruction volume deployment. In addition, the hardware management can provide consistent configuration across a plurality of computing devices by providing configuration selections that are customized based on features of the plurality of computing devices (e.g., hardware configuration, hardware capabilities, etc.).

In some examples, the hardware management described herein can utilize a deployment device that is coupled to a set of computing devices with the deployment device being physically separate from the set of computing devices. In some examples, the deployment device can be physically combined with other devices including general purpose storage devices or network devices. In some examples, the deployment device can be coupled to a computing device and physically combined with the computing device.

The hardware management as described herein can utilize the deployment device to generate instruction volumes that can be configured for a particular computing device (e.g., a server) based on a build plan. In some examples, the build plan can be defined or configured through a user interface. In some examples, the hardware management can utilize the deployment device to make changes to instruction volumes, perform analysis of instruction volumes, or create new images for future deployment.

The deployment device can include a memory resource that is separate from the computing devices, utilize a processing resource that is separate from the computing devices, or coupled to the memory resource that is separate from the computing devices. The deployment device can include a repository having a plurality of deployment plans, golden images, build plans, or scripts to be used for deployment of instruction volumes. In some examples, the deployment of instruction volumes can be defined or configured through a user interface. In some examples, the repository can include firmware for computing device configuration or a set of profiles.

In some examples, the deployment device can be directly connected to a memory resource that can be utilized to store a plurality images or volumes for corresponding computing devices. In some examples, the images and volumes can be stored on the memory resource of the deployment device for a set of corresponding computing devices. In some examples, instruction volumes can be stored in the volume storage for deployment to a particular computing device via the deployment device. In some examples, multiple versions of the instruction volumes can be stored in the volume storage to switch the hardware configuration of the computing device between the multiple versions.

In some examples, the volume storage can be utilized to examine the instruction volumes. In some examples, examining the instruction volumes can include scanning the volume storage for malware or unwanted content. In some examples, the management device can perform actions based on the results of scanning the volume storage. In some examples, actions may include replicating or preserving volume content to allow more detailed analysis at a later time or to prevent the malware from removing evidence of the malware. In some examples, actions may include disabling access to the server instruction volume or disabling the server. In some examples, the actions may include reconfiguring the computing device or creating a new instruction volume.

In some examples, the deployment device can create an image from an existing instruction volume stored in the volume storage. In some examples, the deployment device can modify images to remove instruction volume content specific to a computing device based on a build plan that can be defined or configured through a user interface. The deployment device may have a set of build plans each having a set of settings. In some examples, these settings may have type constraining values allowed for the settings. In some examples, the settings may have default values or additional value constraints. The build plans may each have a set of build steps using build scripts or programs. The scripts or programs may use setting values to modify instruction volumes during deployment.

The deployment device may have a set of golden images. The deployment device may have a set of deployment plans with each having a corresponding golden image and build plan. In some examples, the deployment plan can provide or override default values for build plan settings. In some examples, the deployment plan can include additional constraints for setting values. In some examples, the deployment plan can hide settings, or lock values, to prevent profiles from changing setting values.

In some examples, a device manager and deployment device may define a set of user roles. In some examples, different user roles may have differing permissions to create, modify, examine, and delete deployment plans, golden images, build plans, and build scripts. In some implementations, different user roles may have different permissions to create, modify, examine, and delete profiles having deployment plans. In some examples, different user roles may have different permissions to deploy servers and control which profile is applied to a server.

Figure 2:
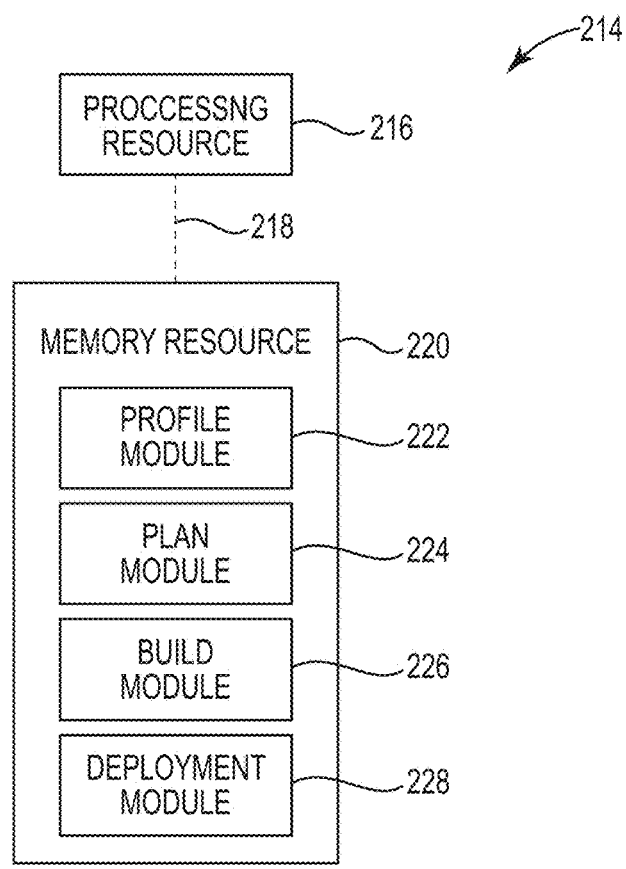
FIG. 2 illustrates a diagram of an example computing device for hardware management consistent with the present disclosure.

FIGS. 1 and 2 respectively illustrate an example system 100 and an example computing device 214 consistent with the present disclosure. FIG. 1 illustrates a diagram of an example system for hardware management consistent with the present disclosure. The system can include a database 104, a hardware management system 102, or a set of engines (e.g., profile engine 106, plan engine 108, build engine 110, deployment engine 112). The hardware management system 102 can be in communication with the database 104 via a communication link, and can include the set of engines (e.g., profile engine 106, plan engine 108, build engine 110, deployment engine 112). The hardware management system 102 can include additional or fewer engines than are illustrated to perform the various functions as will be described in further detail in connection with FIGS. 3-4.

The set of engines (e.g., profile engine 106, plan engine 108, build engine 110, deployment engine 112) can include a combination of hardware and programming, but at least hardware, that is configured to perform functions described herein (e.g., generate a profile including a deployment plan for a computing device, generate a master volume based on the deployment plan, the master volume being stored in a volume storage, generate a copy of the master volume, and to provide a set of scripts to alter the copy of the master volume based on a the deployment plan, deploy the altered copy of the master volume to the computing device, etc.) stored in a memory resource (e.g., computer readable medium, machine readable medium, etc.) as well as hard-wired program (e.g., logic).

The profile engine 106 can include hardware or a combination of hardware and programming, but at least hardware, to generate a profile including a deployment plan for a computing device. Generating the profile that includes the deployment plan can include a selection of a set of configuration features for the computing device. In some examples, the generated profile can be utilized to generate a corresponding deployment plan for generating an instruction volume that can be deployed to the computing device. As described herein, the instruction volume can include boot instructions or run instructions that can be utilized to configure the computing device.

The plan engine 108 can include hardware or a combination of hardware and programming, but at least hardware, to generate a master volume based on the deployment plan, the master volume being stored in a volume storage e. In some examples, generating the master volume can include copying a golden image (e.g., master image, cache image, etc.) of a computing device or computing device type. In some examples, the golden image can include a set of default configuration settings and custom settings based on the deployment plan or generated profile. In some examples, the golden image can include a copy of a volume that was previously utilized by a computing device. In some examples, the golden image can include an archive of files or instruction packages (e.g., software packages, etc.).

In some examples, the altered copy of the master image is stored in the volume storage. In some examples, the altered copy comprises an operating system boot volume. In some examples, the altered copy comprises an operating system boot volume altered for use by an individual computing device. In some examples, the altered copy includes a secret or security content.

The build engine 110 can include hardware or a combination of hardware and programming, but at least hardware, to generate a copy of the master volume, and to provide a set of scripts to alter the copy of the master volume based on a the deployment plan. Generating a copy of the master volume can include copying the set of settings to a second volume such as an instruction volume. In some examples, the instruction volume can be customized to include a set of altered settings. In some examples, the set of settings can be altered through a set of executable scripts.

In some examples, the deployment plan defines a set of parameters that are utilized to define or control the set of scripts. In some examples, the deployment plan includes a hierarchy of plans. In some examples, the hierarchy of plans constrains the ability to change parameter values or the permissible values allowed in other levels of the hierarchy.

In some examples, the set of executable scripts can be applied to the instruction volume based on a set of configuration selections. In some examples, the configuration selections can be provided to a user via a user interface. In some examples, the configuration selections can be based on a computing device type where the instruction volume is to be deployed. In some examples, the configuration selections can be based on a profile of the user. For example, a set of configuration selections can be presented to a user via a user interface to enable a user to select an option for each of the set of configuration selections.

The deployment engine 112 can include hardware or a combination of hardware and programming, but at least hardware, to deploy the altered copy of the master volume to the computing device. Deploying the altered copy of the master volume can include deploying an instruction volume that includes a set of customized configuration selections. In some examples, deploying the altered copy of the master volume can include deploying an instruction volume that comprises a boot volume and firmware configuration for the computing device. In some examples, the deployment plan can include a boot volume and firmware configuration for the computing device. In these examples, the boot volume and firmware configuration can be implemented on the instruction volume by the build engine 110 via a set of scripts that alter the master volume.

FIG. 2 illustrates a diagram of an example computing device 214 consistent with the present disclosure. The computing device 214 can utilize software, hardware, firmware, or logic to perform functions described herein.

The computing device 214 can be any combination of hardware and program instructions configured to share information. The hardware, for example, can include a processing resource 216 or a memory resource 220 (e.g., computer-readable medium (CRM), machine readable medium (MRM), database, etc.). A processing resource 216, as used herein, can include any set of processors capable of executing instructions stored by a memory resource 220. Processing resource 216 may be implemented in a single device or distributed across multiple devices. The program instructions (e.g., computer readable instructions (CRI)) can include instructions stored on the memory resource 220 and executable by the processing resource 216 to implement a function (e.g., generate an instruction volume by copying a master volume, wherein the instruction volume is a computing device image, execute a set of scripts to alter the instruction volume based on a profile for a computing device, deploy the instruction volume to the computing device to configure the computing device based on the profile for the computing device, etc.).

The memory resource 220 can be in communication with a processing resource 216. A memory resource 220, as used herein, can include any set of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, or removable storage medium in communication with the processing resource 216 via the electronic bus.

A set of modules (e.g., profile module 222, plan module 224, build module 226, deployment module 228) can include CRI that when executed by the processing resource 216 can perform functions. The set of modules (e.g., profile module 222, plan module 224, build module 226, deployment module 228) can be sub-modules of other modules. For example, the profile module 222 and the plan module 224 can be sub-modules or contained within the same computing device. In another example, the set of modules (e.g., profile module 222, plan module 224, build module 226, deployment module 228) can comprise individual modules at separate and distinct locations (e.g., CRM, etc.).

Each of the set of modules (e.g., profile module 222, plan module 224, build module 226, deployment module 228) can include instructions that when executed by the processing resource 216 can function as a corresponding engine as described herein. For example, the profile module 222 can include instructions that when executed by the processing resource 216 can function as the profile engine 106.

Figure 3:
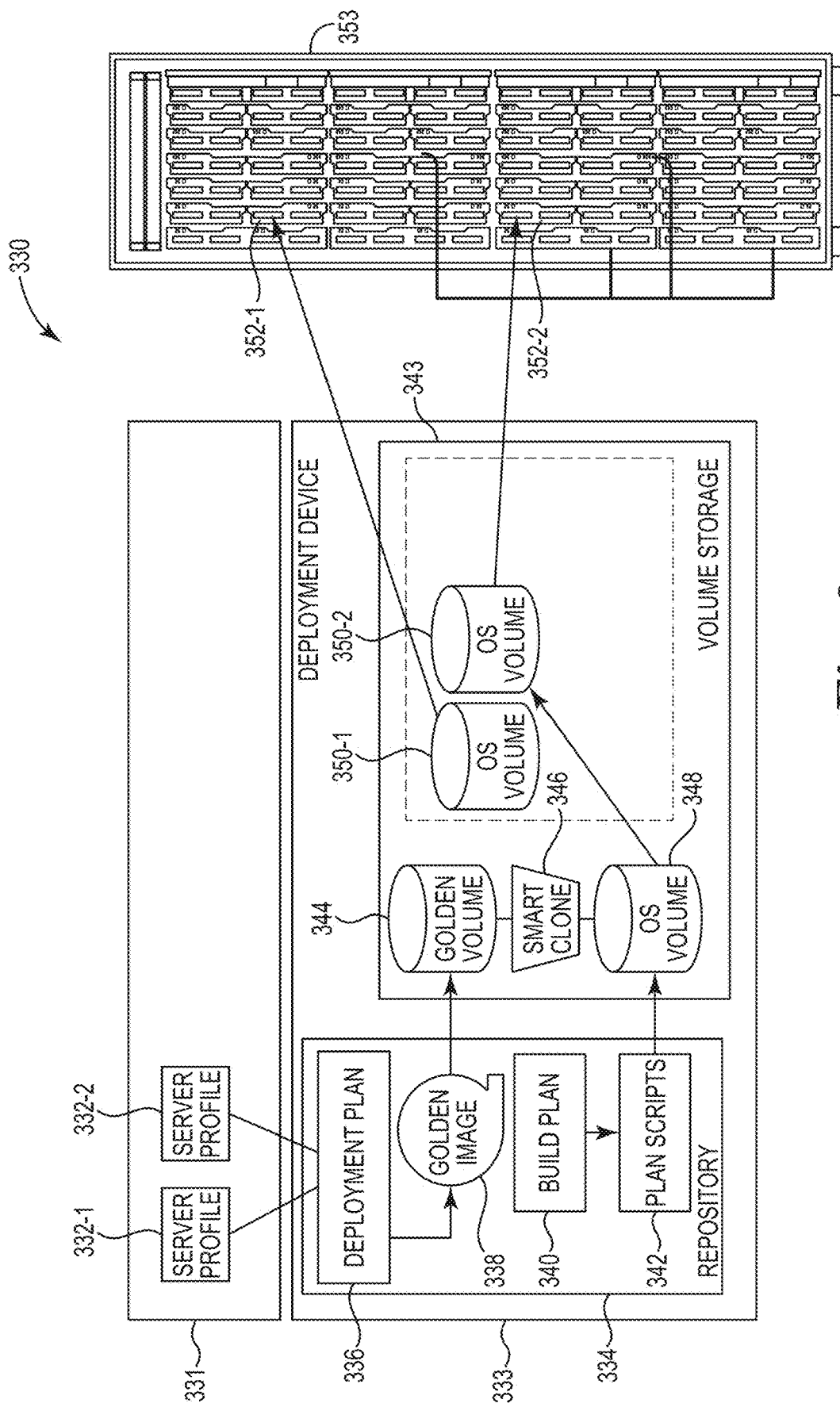
FIG. 3 illustrates a diagram of an example system for hardware management consistent with the present disclosure.

FIG. 3 illustrates a diagram of an example of a system 330 for hardware management consistent with the present disclosure. In some examples, the system 330 can include a profile manager 331 to receive, generate, or manage a set of server profiles 332-1, 332-2. The server profiles 332-1, 332-2 can be utilized to generate a set of instruction volumes 350-1, 350-2 to be deployed to a set of computing devices 352-1, 352-2 within a blade enclosure 353. The profile manager 331 can be coupled to a deployment device 333. In some examples, the deployment device 333 can include a repository 334 and a volume storage 343 for generating the set of instruction volumes 350-1, 350-2 to be deployed to the set of computing devices 352-1, 352-2.

In some examples the profile manager 331 can be utilized to generate the set of server profiles 332-1, 332-2. In some examples, the profile manager 331 can be utilized to provide a set of configuration selections for generating the set of server profiles 332-1, 332-2. In some examples, the set of configuration selections can be utilized to customize hardware settings such as boot settings or run settings of a set of computing devices 352-1, 352-2. Providing the set of configuration selections for generating the set of server profiles 332-1, 332-2 via a user interface is described further herein with reference to FIG. 4. In some examples, the profile manager 331 can store the set of server profiles 332-1, 332-2. The stored server profiles 332-1, 332-2 can be accessed at a later time to enable additional execution of the stored server profiles 332-1, 332-2.

In some examples, the repository 334 can include a deployment plan 336. In some examples, the deployment plan 336 can be based on a corresponding server profile 332-1, 332-2. The deployment plan 336 can define a set of execution steps for deploying an instruction volume 350-1, 350-2 to a particular computing device 352-1, 352-2. For example, the deployment plan 336 can define what type of golden image 338 is utilized for a corresponding server profile 332-1, 332-2. In some examples, the deployment plan 336 can define an execution of the server profiles 332-1, 332-2 to generate corresponding instruction volumes 350-1, 350-2 stored in the volume storage 343. In some examples, the deployment plan 336 can define a set of parameters within the build plan 340 that are utilized to define the set of plan scripts 342.

In some examples, the set of server profiles 332-1, 332-2 can be utilized to select a golden image 338. The golden image 338 can be a master image of a computing device. For example, the golden image 338 can be a master image that includes OS configuration data. In some examples, the golden image 338 can be an image generated from a computing device at a time when the computing device was operating at a particular specification. In some examples, the golden image 338 can be selected from a plurality of golden images based on the set of server profiles 332-1, 332-2. For example, a server profile 332-2 can include an OS type and other default configuration settings that can be utilized to select the golden image 338. In this example, the golden image 338 can include configuration settings that match the default configuration settings of the server profile 332-2.

In some examples the golden image 338 can be copied and stored in the volume storage 343 as a golden volume 344. In some examples, the golden volume 344 can be a volume that is not altered. In some examples, the golden volume 344 can be utilized for a plurality of different server profiles. For example, the golden volume 344 can be utilized to generate instruction volume 350-1 from the server profile 332-1 and the golden volume 344 can also be utilized to generate instruction volume 350-2 from the server profile 332-2. In some examples, the server profile 332-1 and the server profile 332-2 can utilize a different golden image and different golden volume for generating an instruction volume.

In some examples, the golden volume 344 can be copied to an instruction volume 348. In some examples, a smart clone engine 346 can be utilized to copy the golden volume and generate the instruction volume 348. In some examples, the smart clone engine 346 can be utilized to copy configuration settings from the golden volume 344 to generate the instruction volume 348. In some examples, the smart clone engine 346 can copy configuration settings from the golden volume 344 based on a corresponding server profile 332-1, 332-2.

In some examples, the deployment plan 336 can define a build plan 340. The build plan 340 can be utilized to generate plan scripts 342 for altering the instruction volume 348. As described herein, the build plan 340 can be based on a corresponding server profile 332-1, 332-2. For example, a set of configuration settings can be selected for the server profile 332-2 and the build plan 340 can define the plan scripts 342 for altering the instruction volume 348 to reflect the set of configuration settings. In some examples, the plan scripts 342 can be transferred to the instruction volume 348 to alter the instruction volume 348. That is, the plan scripts 342 can include a set of scripts (e.g., instructions, etc.) that can be utilized to customize the instruction volume 348 based on a corresponding server profile 332-1, 332-2.

When the plan scripts 342 are implemented in the instruction volume 348, the instruction volume 348 can be stored within the volume storage as instruction volume 350-2. The first deployment device 333 can allow the plan scripts 342 to run within the repository 334 (e.g., build environment, etc.). In some examples, the deployment device 333 can allow read-only access to particular instruction volumes and allow read/write access to other instruction volumes. In some examples, the plan scripts 342 can be provided to alter the instruction volume 348 offline from the computing devices 352-1, 352-2. That is, the plan scripts 342 may not be executed on the computing devices 352-1, 352-2 until the plan scripts 342 have been provided to the instruction volume 348 and the instruction volume 348 has been transferred to volume storage 343 as instruction volume 350-2.

In some examples, a set of containers or virtual machines can be utilized to provide a repository 334 to transfer the plan scripts 342 to the instruction volume 348. Utilizing the set of containers or virtual machines can protect the deployment device 333 from malicious scripts that are embedded in the plan scripts 342. The set of container or virtual machines can be utilized to generate a build environment as described herein. In addition, the set of containers or virtual machines can allow the deployment device 333 to reuse instruction volumes 350-1, 350-2 for deployment or allow the deployment device 33 to dispose of instruction volumes 350-1, 350-2 and generate new instruction volumes.

In some examples, the build plan 340 can define a set of network connections to utilize when deploying the instruction volumes 350-1, 350-2. For example, there can be a set of network connections that couple the deployment device 333 to the set of computing devices 352-1, 352-2 that can be selected for deploying the instruction volumes 350-1, 350-2. In some examples, particular network connections can be blocked to avoid deploying the instruction volumes 350-1, 350-2 to an incorrect computing device 352-1, 352-2 or to an incorrect memory resource on the set of computing devices 352-1, 352-2.

In some examples, there can be a physical separation between the set of computing devices 352-1, 352-2 and the deployment device 333. In some examples, a separation between the set of computing devices 352-1, 352-2 and the deployment device 333 can prevent the plan scripts 342 from affecting the set of computing devices 352-1, 352-2. For example, executing the plan scripts 342 on the instruction volume 348 can prevent malicious plan scripts from affecting the OS of the set of computing devices 352-1, 352-2.

In some examples, the build plan 340 can define a set of security settings for a computing device 352-1, 352-2. For example, the build plan 340 can define a type of security platform to be implemented on the computing device 352-1, 352-2. In some examples, the type of computing device can be utilized to determine the type of security platform to be implemented.

In some examples, the instruction volumes 350-1, 350-2 can be deployed to a set of computing devices 352-1, 352-2. In some examples, the instruction volumes 350-1, 350-2 can be a set of different instruction volume versions for a set of different computing devices 352-1, 352-2. For example, a server manager can deploy instruction volume 350-1 to computing device 352-1 for a first period of time and deploy instruction volume 350-2 to computing device 352-1 for a second period of time. In another example, a server manager can deploy instruction volume 350-1 to computing device 352-1 when utilizing the computing device 352-1 for a first functionality and deploy instruction volume 350-2 to computing device 352-1 when utilizing the computing device 352-1 for a second functionality. In some examples, the first functionality and the second functionality can utilize a set of different applications, virtual machines, or configuration settings to execute a corresponding set of functions.

In some examples, the instruction volumes 350-1, 350-2 can be deployed to the set of computing devices 352-1, 352-2 via image based deployment. As used herein, image based deployment can include applying the instruction volumes 350-1, 350-2 as golden image structures. That is, the instruction volumes 350-1, 350-2 can be deployed and applied to the computing devices 352-1, 352-2 as if the instruction volumes 350-1, 350-2 were a golden image 338. In some examples, the image based deployment of the instruction volumes 350-1, 350-2 can allow the computing devices 352-1, 352-2 to be booted directly based on the deployed instruction volumes 350-1, 350-2.

In some examples, the instruction volumes 350-1, 350-2 can include hardware configurations and instruction configurations for a corresponding computing device 352-1, 352-2. For example, a set of hardware settings can be defined by the instruction volumes 350-1, 350-2 and a set of software settings can be defined by the instruction volumes 350-1, 350-2. In some examples, deploying the instruction volumes 350-1, 350-2 can include simultaneously configuring the hardware and software of the computing devices 352-1, 352-2. In some examples, the configuration of the computing devices 352-1, 352-2 can be performed with less time compared to previous systems and methods.

In some examples the instruction volumes 350-1, 350-2 stored within the volume storage 343 can be examined for malware and other malicious instructions prior to being deployed to the set of computing devices 352-1, 352-2. As described herein, the plan scripts 342 can include malicious scripts that can negatively affect the instruction volumes 350-1, 350-2. In previous systems, the malicious scripts could potentially affect the OS of the computing devices 352-1, 352-2. However, by examining the instruction volumes 350-1, 350-2 for malware prior to deploying the instruction volumes 350-1, 350-2 can prevent the malicious scripts from affecting the OS of the computing devices 352-1, 352-2.

In some examples, a set of actions can be executed upon detection of malware. In some example, the set of actions can include, but are not limited to: making a copy of the instruction volumes 350-1, 350-2; disabling access to the instruction volumes 350-1, 350-2; stopping a computing device 352-1, 352-2 that is utilizing the instruction volumes 350-1, 350-2; reapplying a profile to repair the computing device; or redeploying the instruction volumes 350-1, 350-2.

The system 330 can enable for hardware management that is easier to execute and manage hardware by virtualizing the instruction volumes 350-1, 350-2 compared to previous systems and methods. The system 330 can provide a visual representation of instruction volumes 350-1, 350-2 that can be deployed to configure and boot a particular computing device 352-1, 352-2. The system 330 can be utilized to simultaneously configure hardware and instructions corresponding to the computing devices 352-1, 352-2. By configuring the hardware and instructions simultaneously, the hardware and instruction configurations can maintain consistency and provide better computing device performance.

FIG. 4 illustrates a diagram of an example of a user interface 460 for hardware management consistent with the present disclosure. The user interface 460 can be a representation of a user interface for defining a server profile as described herein. In some examples, the user interface 460 can define a set of user roles. In some examples, different user roles may have differing permissions to create, modify, examine, and delete deployment plans, golden images, build plans, and build scripts. In some examples, different user roles may have different permissions to deploy instruction volumes and control which profile is applied to a computing device.

The server profile can define a set of hardware configurations and a set of instruction configurations for a computing device. The user interface 460 can include a representation of a user interface for generating a server profile that can be utilized to define a deployment plan as described herein. In some examples, the user interface 460 can be a display generated by a profile manager (e.g., profile manager 331 as referenced in FIG. 3, etc.).

The user interface 460 can include a general section 462 to define a set of general configuration settings for the server profile. The general section 462 can include a text box for generating a name 466. In some examples, the name 466 can be utilized to indicate a designated computing device that can utilize the server profile. In some examples, a generic name such as "server 1" can be utilized. In other examples, a specific server name or number can be utilized as the name 466. In some examples, the name 466 can be displayed in the volume storage (e.g., volume storage 343 as referenced in FIG. 3, etc.).

The general section 462 can include a description 468. In some examples, the description 468 can include a general description of a purpose of the server profile. As described herein, a particular computing device can utilize a plurality of different server instruction volumes that are generated by different server profiles. In these examples, the description 468 can be utilized to distinguish between the different instruction volumes or the different server profiles.

The general section 462 can include a server profile template 470. The server profile template 470 can include a dropdown box or selection box to select from a set of existing server profile templates. In some examples, the server profile template 470 can include a set of default settings for the instruction volume to be generated. In some examples, the server profile template 470 can include a set of default settings that correspond to a particular server functionality. For example, the server profile template 470 can provide a general description of what types of functions a server can provide when configured to the server profile template 470. In some examples, a selection of a particular server profile template 470 can limit or expand a set of selections for other elements of within the general section 462. For example, a first server profile template 470 can allow for specific server hardware to be selected and a second server profile template 470 can allow for a greater number or fewer set of server hardware to be selected.

The general section 462 can include server hardware selection 472. The server hardware selection 472 can include a set of computing devices that can receive the instruction volume generated by the server profile. For example, the server hardware selection 472 can include a list of computing devices within a blade enclosure to deploy an instruction volume generated by the server profile. In some examples, the server hardware selection 472 can include a set of computing devices that are coupled to a deployment device (e.g., deployment device 333 as referenced in FIG. 3, etc.).

The general section 462 can include a server hardware type 474. The server hardware type 474 can be utilized to define what type of hardware is included within a particular computing device. For example, a blade enclosure can include set of different computing device types that can each have different types of hardware. In some examples, the type of hardware within a computing device can limit a functionality of the computing device. For example, a first computing device with a first type of hardware can have superior computing resources (e.g., processors, memory resources, etc.) compared to a second serer blade with a second type of hardware. In some examples, the server hardware type 474 can correspond to a particular generation of computing device.

The general section 462 can include an enclosure group 476. The enclosure group 476 can define a particular blade enclosure within a data center where the instruction volume generated from the server profile is deployed. The general section 462 can include an affinity 478. In some examples, the server profile can include an affinity 478 for a server bay. In some examples, the affinity 478 can be selected based on affinities that are provided by a corresponding computing device as described herein.

The user interface 460 can also include a set of deployment settings 464. The deployment settings 464 can include an OS deployment plan 480. As described herein, the OS deployment plan 480 can define a build plan to transfer a set of plan scripts to an instruction volume. As described herein, the plan scripts can make a set of changes or alterations to the instruction volume. In some examples, the OS deployment plan 480 can be selected from a set of predefined deployment plans for a particular type of server hardware.

In some examples, the set of deployment settings 464 can include a set of value settings 482. The set of value settings 482 can include a host name for the computing device when the instruction volume generated by the server profile is deployed to the computing device. That is, when the computing device is configured by the deployed instruction volume, a particular host name can be simultaneously provided to the computing device. In some examples, the set of deployment settings 464 can include a value setting 482 of whether to utilize encrypted communication. For example, the value settings 482 can include a selection of whether to utilize soft shell (SSH) protocol. In some examples, additional encrypted communication protocols can be included within the value settings 482.

As described herein, the user interface 460 can allow a user to generate a server profile for a specific computing device or a plurality of computing devices via a selection process. In some examples, additional selections can be included within the user interface 460. In some examples, the selections can be based on a profile of a user. For example, a user with relatively more expertise can have additional selections displayed compared to a user with relatively less expertise. In this example, the user interface 460 can be altered for each of a plurality of users to avoid misconfiguration of computing devices.

The user interface 460 can allow customization of a server profile for generating instruction volumes to be deployed to a set of computing devices. The user interface 460 can simplify computing device configuration by providing server profile templates that can be utilized for specific hardware. In some examples, the server profile templates can include default configuration selections for hardware and instructions stored on the computing devices. In some examples, the user interface 460 can allow for relatively faster configuration of computing devices compared to previous systems and methods.

As used herein, "logic" is an alternative or additional processing resource to perform a particular action or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a set of" something can refer to one or more such things. For example, "a set of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system for hardware management, comprising:
one or more processors; and
a non-transitory machine-readable medium storing instructions that, when executed, cause the one or more processors to:
generate a profile including a deployment plan for a computing device;
generate a master volume based on the deployment plan, the master volume being stored in a volume storage;
generate a copy of the master volume, wherein the instruction volume includes a set of default settings from the master volume and a set of altered settings based on a set of scripts;
examining a health state of the instruction volume through direct access to the volume storage, including examining the instruction volume within the volume storage for malware;
provide a set of executable instructions to alter the copy of the master volume based on the deployment plan including a set of configuration settings to customize the master volume to the computing device; and
deploy the altered copy of the master volume to the computing device.

2. The system of claim 1, wherein the altered copy of the master volume is stored in the volume storage.

3. The system of claim 1, wherein the altered copy of the master volume comprises an operating system boot volume and firmware configuration for the computing device.

4. The system of claim 3, wherein the altered copy of the master volume is deployed to the computing device by deploying the operating system boot volume and firmware configuration to the computing device together.

5. The system of claim 1, wherein the one or more processors further to generate the copy of the master volume and to provide the set of scripts offline from the computing device.

6. The system of claim 1, wherein the one or more processors further to define a set of user roles and corresponding content of the user roles to generate a profile and deploy the altered copy of the master volume.

7. The system of claim 1, wherein the deployment plan defines a set of parameters that are utilized to define the set of scripts.

8. A non-transitory computer-readable medium storing instructions executable by a processor for hardware management, wherein the instructions are executable to:
generate an instruction volume by copying a master volume, wherein the instruction volume is a computing device image and the instruction volume includes a set of default settings from the master volume and a set of altered settings based on a set of scripts;
examining a health state of the instruction volume through direct access to the volume storage, including examining the instruction volume within the volume storage for malware;
execute a set of executable instructions to alter the instruction volume based on a profile to customize the instruction volume to the computing device; and
deploy the instruction volume to the computing device to configure the computing device based on the profile for the computing device.

9. The medium of claim 8, wherein the instruction volume includes a set of default settings from the master volume and a set of altered settings based on the set of scripts.

10. The medium of claim 8, wherein the computing device is booted directly based on the deployed instruction volume.

11. The medium of claim 8, wherein generating the instruction volume comprises generating a plurality of instruction volumes for a plurality of different computing devices utilizing a default setting of the master volume.

12. A method for hardware management, comprising:
generating, at a volume storage, a master volume based on a master image of a computing system;
generating, on the volume storage, an instruction volume based on the master volume, wherein the instruction volume includes a set of default settings from the master volume and a set of altered settings based on a set of scripts;
examining a health state of the instruction volume through direct access to the volume storage, including examining the instruction volume within the volume storage for malware;
altering, via a set of executable instructions, a set of settings of the instruction volume to customize the instruction volume to the computing system; and
deploying, from the volume storage, the instruction volume to the computing system, wherein the instruction volume provides a system boot volume and firmware configuration for the computing system.

13. The method of claim 12, further comprising examining a health state of the instruction volume through direct access to the volume storage.

14. The method of claim 12, further comprising deploying, from the volume storage, the altered instruction volume to a different computing system.

15. The method of claim 12, wherein the computing system is booted directly based on the deployed instruction volume.

16. The method of claim 12, wherein generating the instruction volume comprises generating a plurality of instruction volumes for a plurality of different computing devices utilizing a default setting of the master volume.

17. The method of claim 12, wherein the instructions are further executable to examine a health state of the instruction volume through direct access to the volume storage.

\* \* \* \* \*